United States Patent
Fukushima et al.

(10) Patent No.: US 6,306,502 B1
(45) Date of Patent: Oct. 23, 2001

(54) COATING COMPOSITION FORMING WEAR-RESISTANT COAT AND ARTICLE COVERED WITH THE COAT

(75) Inventors: Hiroshi Fukushima; Misao Tamura; Osamu Takemoto; Katsumi Yonekura, all of Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/043,486

(22) PCT Filed: Sep. 20, 1996

(86) PCT No.: PCT/JP96/02723

§ 371 Date: Mar. 19, 1998

§ 102(e) Date: Mar. 19, 1998

(87) PCT Pub. No.: WO97/11129

PCT Pub. Date: Mar. 27, 1997

(30) Foreign Application Priority Data

Sep. 20, 1995 (JP) .................................................. 7-264712

(51) Int. Cl.[7] ............................ C09D 4/02; C09D 175/16; C08J 7/04; C08J 3/28
(52) U.S. Cl. ............................ 428/412; 428/447; 522/28; 522/30; 522/79; 522/64; 522/83; 522/96; 524/858; 524/864; 524/865; 528/20; 528/23; 528/26
(58) Field of Search ................................. 522/83, 84, 85, 522/96, 28, 30, 79, 64; 428/412, 447; 524/806, 868, 809, 858, 864, 865; 528/20, 23, 26

(56) References Cited

U.S. PATENT DOCUMENTS

| 4,006,271 | 2/1977 | French et al. ...................... 427/164 |
|---|---|---|
| 4,348,462 | 9/1982 | Chung .................................. 428/412 |
| 4,455,205 | 6/1984 | Olson et al. ..................... 204/159.13 |
| 4,486,504 | 12/1984 | Chung .................................. 428/412 |
| 4,491,508 | 1/1985 | Olson et al. ..................... 204/159.13 |
| 5,258,225 | 11/1993 | Katsamberis ......................... 428/331 |
| 5,426,131 | 6/1995 | Katsamberis ........................... 522/16 |
| 5,449,702 | * 9/1995 | Tayama et al. ........................... 522/4 |
| 5,635,544 | * 6/1997 | Tamura et al. ......................... 522/79 |
| 5,695,851 | * 12/1997 | Watanabe et al. .................... 428/147 |

FOREIGN PATENT DOCUMENTS

| 58-1756 | 7/1983 | (JP) . |
|---|---|---|
| 2-129235 | 5/1990 | (JP) . |
| 3-275769 | 12/1991 | (JP) . |
| 4-214743 | 8/1992 | (JP) . |
| 7-68714 | 8/1993 | (JP) . |
| 7-109355 | 10/1993 | (JP) . |

* cited by examiner

Primary Examiner—Susan W. Berman
(74) Attorney, Agent, or Firm—Finnegan, Henderson, Farabow, Garrett & Dunner, L.L.P.

(57) ABSTRACT

A coating composition forming a abrasion resistant coating comprising (A) an ultraviolet-curable silicone prepared by chemically modifying particulate colloidal silica with a specific silane compound, (B) a monomer mixture comprising a (meth)acrylate having a specific isocyanate skeleton and a urethane poly(meth)acrylate having an alicyclic skeleton, and (C) a photo-polymerization initiator. By using a urethane poly(meth)acrylate having an alicyclic skeleton as part of the component (B) and the component (A) having an enhanced reactivity of chemical modification, the compatibility of the component (A) with the component (B) is improved to give a cured coating with excellent wear resistance, weather resistance and durability.

15 Claims, No Drawings

COATING COMPOSITION FORMING WEAR-RESISTANT COAT AND ARTICLE COVERED WITH THE COAT

FIELD OF TECHNOLOGY

The present invention relates to a coating composition capable of forming a abrasion resistant coating and articles covered with said coating; it specifically relates to a coating composition capable of curing on irradiation with active energy rays and of forming on the surface of a substrate a abrasion resistant coating comprising a cross-linked cured coating which has excellent clarity, abrasion resistance, surface smoothness, heat-resistance, chemical-resistance, durability, weathering resistance, and adhesion to the substrate, and to articles covered with said coating.

BACKGROUND TECHNOLOGY

Synthetic resin molded articles, such as polymethyl methacrylate resins, polymethacrylimide resins, polycarbonate resins, polystyrene resins, polyolefin resins, and the like, are lighter in weight and superior in impact-resistance compared to glass articles. Because they exhibit a variety of advantages, such as good clarity and ease of molding and processing, they have recently been used in a variety of fields, such as automotive window panes, headlights, tail lights, as well as architectural window panes, highway soundproof barrier walls, and the like.

On the other hand, because their surface lacks abrasion resistance, these synthetic resin molded articles tend to suffer some surface-damage when coming into contact with other hand articles or sandy dust and through friction and scratching by such articles. Since the surface damage substantially reduces the commercial value of such molded articles or causes the product to be unusable within short periods, improvement of surface abrasion resistance has been much needed. Particularly, when they are used in the aforementioned automotive materials, weathering resistance is also another important requirement.

Many studies have been made of methods to overcome the deficiencies of these synthetic resin molded articles; for example, there is a method (U.S. Pat. No. 4,006,271) that calls for applying a coating agent comprising a partial hydrolysis condensate of a silane compound, mainly based on an alkyltrialkoxy silane, and colloidal silica, then followed by heat treating, and thereby generating a crosslinked coating to improve the wear resistance..

Said process provides plastic molded articles with a high degree of abrasion resistance, but these articles are not satisfactorily in durability or weathering resistance, and the coating, which is based on a coating agent comprising a partial hydrolysis condensate of the above silane compound and colloidal silica, exhibits insufficient adhesion.

A method has been developed to provide a coating with improved adhesion by a prior priming, with an acrylic or silicone or the like, of a plastic molded article for improved adhesion between the molded article and the primer, and then coating the primed layer with the aforementioned coating, thereby providing improved adhesion between said primer layer and the coated layer. However, this coating method involves complicated process steps and does not provide satisfactory properties. Since the coating-curing time is long, the process is economically disadvantageous and also poor in productivity.

A method overcoming such a deficiency is disclosed in Japanese Patent Kohyo Publication No. Sho57-500984 (U.S. Pat. No. 4,348,462) involving an ultraviolet-curable coating agent comprising colloidal silica and a small amount of an alkoxysilane having a methacryloyloxy group or a glycidyl group, wherein a non-silyl acrylate being the main component, thereby improving the adhesion to the surface of the plastic molded article, as well as a method of coating a plastic molded article surface with this coating agent, followed by irradiating it with ultraviolet light for curing, thereby generating a plastic molded article with a wear resistant coating. Coating compositions, which are essentially free of any non-polymerizable organic solvent, comprising colloidal silica, small amounts of a hydrolysis product of a silylacrylate, photo-polymerization initiators, and polyfunctional acrylates being as main components, have also been disclosed in Japanese Patent Laid-open Publication No. Sho58-1756 (U.S. Pat. Nos. 4,455,205, 4,486,504 and 4,491,508); ultraviolet-curable coating compositions containing a small amount of a colloidal silica which has been chemically modified with a radical polymerizable silane, comprising as a main component a polyfunctional acrylate and a polyfunctional urethane acrylate having a specific structure, have been disclosed in Japanese Patent Laid-open Publication No. Hei4-214743 (U.S. Pat. Nos. 5,258,225 and 5,426,131).

Compositions generating these abrasion resistant coatings have provided excellent adhesion to substrates with no primer treatment and allowed the coating-curing time to be shortened, but they have tended to make the coating turbid, making it difficult to obtain a completely clear cured coating, and have shown an unsatisfactory balance with durability such as weather resistance, abrasion resistance, and the like.

The present inventors continued their analysis of the causes for the above problems and discovered that the condensation reaction between the colloidal silica and the radical polymerizable silane compound has been insufficient, causing the resultant chemically modified colloidal silica to exhibit an inferior compatibility with the polyfunctional acrylate, and proposed a photo-polymerizable coating composition as disclosed in Japanese Patent Laid-open Publication No. Hei3-275769, which composition comprised a chemically modified colloidal silica with (meth)acryloyloxy silane upon sufficiently advanced conversion in the condensation reactor, along with bis (acryloyloxyethyl)hydroxyethyl isocyanurate,and a photo-polymerization initiator.

The cured coatings generated from the above coating composition had good features in that they were free of turbidity and clear, with good optical properties, and with relatively good abrasion resistance under the Taber abrasion test, steel wool test, and the like, as well as with good weather resistance, but none have yet provided an ultraviolet-curable covering material having completely satisfactory properties because of a crack formation problem in a heat cycle test.

After a diligent analysis of the causes for the above problem, the present inventors discovered that allowing the condensation reaction between the colloidal silica and the (meth)acryloyloxy silane compound to proceed fully has improved, to some extent, the compatibility of the chemically modified colloidal silica with the bis(acryloyloxyethyl) hydroxyethyl isocyanate, but their compatibility has still not been enough, making it impossible to sufficiently suppress the phase separation of these two components in the process of generating a cured coating, which was a major cause of the above deficiency.

DISCLOSURE OF THE INVENTION

Based upon the above views, the present invention has been completed on the basis of the discovery that a combined use of a poly(acryloyloxyalkyl)-isocyanurate and a urethane poly(meth)acrylate having an alicyclic skeleton, as the polyfunctional acrylate members, can sufficiently suppress the phase separation of the colloidal silica in the cured coating, not only enabling the formation of a highly heat resistant cured coating with no crack formation in a heat cycle test, but also providing a coating composition capable to generating a coating that can substantially improve the balance with wear resistance and weather resistance.

That is, the present invention is a coating composition forming a abrasion resistant coating comprising:

(A) 1–50 parts by weight (as solids) of an ultraviolet-curable silicone prepared by chemically modifying 40–90% by weight (as solids) of particulate colloidal silica (a-1) with 10–60% by weight (as solids) of a radical polymerizable silane compound or its hydrolysis product (a-2), represented by the following General Formula (I)

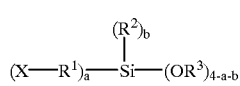

(where X represents $CH_2=CH-COO-$, $CH_2C(CH_3)-COO-$, or $CH_2=CH-$; $R^1$ is an alkylene group with 0–8 carbons; $R^2$ and $R^3$ are alkyl groups with 1–8 carbons; a is a positive integer of 1–3; b is a positive integer of 0–2; and a+b is a positive integer of 1–3);

(B) 45–95 parts by weight of a monomer mixture comprising 30–90 parts by weight of a poly[(meth)acryloyloxy alkyl] isocyanurate (b-1) represented by the following General Formula (II)

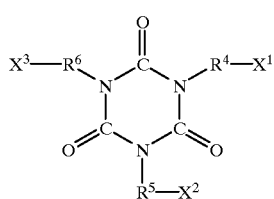

(where X1, X2, and X3 represent acryloyl, methacryloyl, hydrogen atoms, or alkyl wherein at least two thereof are acryloyloxy or methacryloyloxy groups; R4, R5, and R6 represent an oxyalkylene group or a polyoxyalkylene group), and 10–70 parts by weight of a urethane poly(meth)acrylate (b-2) having an alicyclic skeleton using with at least two (meth)acryloyloxy groups in the molecule (wherein the total amount of components (b-1) and (b-2) is 100 parts by weight); and (C) 0.01–5 parts by weight of a photo-polymerization initiator (where the total amount of components (A)–(C) is 100 parts by weight); and articles covered with said coatings.

BEST EMBODIMENTS FOR CARRYING OUT THE INVENTION

Components constituting the coating compositions capable of generating abrasion resistant coatings of this invention (hereafter abbreviated as coating compositions) are now described below.

(A) Component (ultraviolet-curable silicone)

The ultraviolet-curable silicone, component (A), is obtained by chemically modifying particulate colloidal silica, (a-1), with a radical polymerizable silane compound or its hydrolysis product, (a-2), represented by the above General Formula (I).

The (a-1) and (a-2) components are now described in detail.

Component (a-1)

The component (a-1), particulate colloidal silica, is a dispersion in water or an organic solvent of super-fine silicic anhydride ultra fine particles having a primary particle size of 1–200 m$\mu$.

The dispersion media used for the colloidal silica include water; alcoholic solvents such as methanol, ethanol, isopropanol, n-propanol, isobutanol, n-butanol, and the like; polyhydric alcoholic solvents such as ethylene glycol; polyhydric alcohol derivatives such as ethylcellosolve, butylcellosolve, and the like, ketone type solvents such as methylethyl ketone, methylisobutyl ketone, diacetone alcohol, and the like; monomers such as 2-hydroxyethyl acrylate, 2-hydroxypropyl acrylate, tetrahydrofurfuryl acrylate, and the like. In particular, an alcoholic solvent containing not more than three carbon atoms is preferred in the process of chemical modification reaction with the component (a-2)

Such colloidal silica is manufactured by known processes and is also available on the market. The primary particle size is preferably 1–200 m$\mu$, in particular, 5–80 m$\mu$. Neither a particle size less than 1 m$\mu$, which tends to cause a gelation in the chemical modification step by a component (a-2), nor a cured coating generated from a coating composition containing particulate silica exceeding 200 m$\mu$ in primary particle size, which reduces clarity, is preferred.

Colloidal silica functions to considerably improve the abrasion resistance of the cured coating generated from the coating composition of this invention. In particular, fine particles such as particulate silica send or the like, exhibits a substantial improvement in the abrasion resistance of the cured coating. However, a dispersion of colloidal silica by itself in an ultraviolet-curable coating composition is substantially poor in dispersibility so that such a coating composition shows an inferior adhesion to the surface of a synthetic resin molded article.

The present invention has been able to substantially overcome the above difficulty by using a colloidal silica, which has been chemically modified with a component (a-2). The greater the extent of the reaction between components (a-1) and (a-2) becomes, the greater the compatibility between the resultant components (A) and component (B) is obtained, leading to a cured coating with improved abrasion resistance, weather resistance, and durability.

(a-2) Component

The component (a-2), which is a radical polymerizable silane compound represented by the above General Formula (I) or its hydrolysis product, is the component which reacts with the colloidal silica, component (a-1), thereby improving its compatibility with the polyfunctional (meth)acrylate, component (B). The component (a-2) used includes a silane compound which shows polymerization activity under ultraviolet irradiation, such as acryloyloxy, methacryloyloxy, or vinyl group; the colloidal silica prepared by chemically modifying with this silane compound, that is, the ultraviolet-curable silicone (A), generates chemical bonds via ultraviolet-induced polymerization with the polyfunctional (meth)acrylate component (B), thereby toughening the resultant cured coating. The cured coating prepared by the coating composition of this invention shows a substantially enhanced improvement effect on abrasion resistance to become sufficiently highly resistant to scratching by metal fibers such as steel wool, or the like.

Component (a-2) includes specifically, for example, at least 1 silane compound selected from 3-methacryloyloxypropyl trimethoxy silane, 3-acryloyloxypropyl trimethoxy silane, 2-methacryloyloxyethyl trimethoxy silane, 2-acryloyloxyethyl trimethoxy silane, 3-methacryloyloxypropyl triethoxy silane, 3-acryloyloxypropyl triethoxy silane, 2-methacryloyloxyethyl triethoxy silane, 2-acryloyloxyethyl triethoxy silane, 3-methacryloyloxypropylmethyl dimethoxy silane, 3-acryloyloxypropylmethyl dimethoxy silane, vinyl trimethoxy silane, vinyl triethoxy silane, and the like, or hydrolysis product thereof.

From among these, it is specifically preferred to use at least 1 silane compound selected from 3-methacryloyloxypropyl trimethoxy silane, 3-acryloyloxypropyl trimethoxy silane, 3-methacryloyloxypropyl triethoxy silane, 3-acryloyloxypropyl triethoxy silane, vinyl trimethoxy silane, and vinyl triethoxy silane, or its hydrolysis product thereof.

The hydrolysis products of these silane compounds can be obtained by the usual methods such as stirring at room temperature or with heating 1 mole of a silane compound with or without an organic solvent such as an alcohol solvent, optionally with 0.5–6 moles of a hydrolysis catalyst of 0.001–0.1N hydrochloric acid or an aqueous acetic acid solution or the like.

Following is a description of a process for preparing an ultraviolet-curable silicone (A), which is a chemically modified colloidal silica using a radical polymerizable silane compound or its hydrolysis product.

The method of preparing the ultraviolet-curable silicone (A) is the same as that disclosed in Japanese Patent Laid-open Publication No. Hei7-109355 and any detail other than those described here is available as being disclosed in the publication.

The preparation of component (A) is carried out in the presence of colloidal silica, a component (a-1), and a radical polymerizable silane compound or its hydrolysis product, component(a-2), by allowing the dispersion medium for the colloidal silica and the lower alcohol generated by the hydrolysis to azeotropically distill off at atmospheric or at reduced pressure, in the presence of a non-polar solvent such as toluene, thereby replacing the dispersion medium with a non-polar solvent, and then heating to carry out a dehydration-condensation reaction step.

First, a mixture of a component (a-1) colloidal silica with a component (a-2) radical polymerizable silane compound, along with a hydrolysis catalyst is subjected to the usual methods such as stirring at ambient temperatures or with heating to hydrolyze the silane compound. The lower alcohol in the dispersion medium in the colloidal silica and also that generated by the hydrolysis is azeotropically distilled off at atmospheric or at reduced pressure, in the presence of a non-polar solvent, thereby replacing the dispersion medium with the non-polar solvent, followed by treating at a temperature of 60–150° C., preferably at 80–130° C., with the solids concentration being maintained at 30–90% by weight, preferably 50–80% by weight, for 0.5–10 hours with agitation. It is preferred to azeotropically distill off the water generated by the condensation reaction along with the non-polar solvent. This reaction is a good method for increasing the extent of the reaction between components (a-1) and (a-2). It is permissible to use a catalyst such as an acid, a base, a salt, or the like, for the purpose of accelerating the chemical modification reaction.

The ultraviolet-curable silicone (A), which is a colloidal silica chemically modified by a silane compound prepared in this process, is rendered surface-hydrophobic by coating the surface of the colloidal silica having a hydrophilic surface with a radical polymerizable silane compound or its hydrolysis product, thereby showing an improved compatibility with a monomer mixture (B) comprising a polyfunctional acrylate specified in this invention, so as to give a coating from such a coating composition that has good clarity. Even a particularly thick coating generated in this way is essentially haze-free, which makes this optimum for use in optical articles. As described above, the greater the extent of the reaction of components (a-1) with (a-2), the greater the compatibility between components (A) and (B); this is because the greater extent of chemical modification, that is, the extent of coverage with the radical polymerizable silane compound or its hydrolysis product on the surface of colloidal silica, improves its hydrophobicity.

The non-polar solvents used in carrying out the above reactions are selected on the basis of dielectric constants, dipole moments, or hydrogen bond parameters; in a broad sense, it is preferable to use a solvent having a medium degree of polarity for this invention. For example, non-polar solvents having a dielectric constant in the range of 2–10 at 20° C. are preferable in this invention.

Non-polar solvents specifically, for example, include hydrocarbons such as benzene, toluene, xylene, ethylbenzene, cyclohexane, and the like; halogenated hydrocarbons such as trichloroethylene, tetrachloroethylene, and the like, ethers such as 1,4-dioxane, dibutylether, and the like, ketones such as methylisobutyl ketone; esters such as n-butyl acetate, isobutyl acetate, ethyl acetate, ethyl propionate, and the like; polyhydric alcohol derivatives such as ethylene glycol monobutylether and the like. It is also possible to use as a non-polar solvent, an unsaturated ethylenic compound, such as a monomer having at least one (meth)acryloyloxy group, in the molecule. From among these non-polar solvents, it is preferable to use an aromatic hydrocarbon in terms of the reaction between components (a-1) and (a-2); a particularly preferable solvent is toluene.

The solids concentration during the reaction is preferably in the range of 30–90% by weight. A solids concentration less than 30% by weight, with the solvent exceeding 70% by weight, will cause the reaction of the colloidal silica (a-1) with the radical polymerizable silane compound (a-2) to be insufficient so that coating composition containing a colloidal silica chemically modified by a silane compound prepared by such a method will give a cured coating which tends to be poor in clarity.

On the other hand, a solids concentration exceeding 90% by weight will result in a rapid reaction, showing a tendency to generate a problem such as gel formation or the like.

The preferred reaction temperature for the components (a-1) with (a-2) is in the range of 60–150° C. A reaction temperature less than 60° C. would not allow the reaction to proceed fully, requiring an extended time, while a temperature exceeding 150° C. would cause problems such as reactions other than silanol condensation reactions or gel formation and the like.

The weight ratio used for the colloidal silica (a-1) solids with the radical polymerizable silane compound (a-2) solids (in terms of silanol) in the reaction steps should be at a weight ratio of (a-1)/(a-2)=40–90/10–60, preferably 50–80/20–50 (totaling 100 parts by weight). On deviating from the above range for the ratio of the use of the two, for example, with the amount of colloidal silica (a-1) exceeding 90 parts by weight, problems would occur such as an opaque reaction system or gel formation and the like; so that the coating composition containing a colloidal silica chemically modified by a silane compound obtained by such a method will give a cured coating which tends to crack.

An amount of colloidal silica (a-1) less than 40 parts by weight sometimes results in an incomplete reaction, so that a coating composition containing such colloidal silica will give a cured coating with sometimes reduced abrasion resistance or clarity.

The ultraviolet-curable silicone (A) obtained by chemically modifying colloidal silica (a-1) with a radical polymerizable silane compound (a-2) is a component which improves the abrasion resistance, weather resistance, and durability of the cured coating generated from the coating composition of this invention.

The use ratio of component (A) in the coating composition should be 1–50 parts by weight, preferably 10–40 parts by weight in solids of a coating composition comprising components (A)–(C). A coating composition containing less than 1 part by weight of component (A) will give a coating which fails to show any sufficient improvement in abrasion resistance, weather resistance and durability, while a coating composition with the content of component (A) exceeding 50 parts by weight will give a cured coating which begins to show crack formation.

(B) Component (Monomer mixture)

(B) component is one which improves the dispersion stability of the ultraviolet-curable silicone, component (A), in the coating composition of this invention; therefore it is an important component that allows uniform dispersion without any phase separation.

(B) component mainly comprises components (b-1) and (b-2).

Component (b-1)

Poly[(meth)acryloyloxyalkyl] isocyanurate shown by the above General Formula (II), component (b-1), is the component which maintains a high degree of abrasion resistance of the cured coating generated from the coating composition of this invention, and improves the toughness and adhesion of the cured coating.

Component (b-1) specifically includes, for example, tris(acryloyloxyethyl)isocyanurate, tris(methacryloyloxyethyl) isocyanurate, tris(2-acryloyloxypropyl) isocyanurate, tris(2-methacryloyloxypropyl)isocyanurate, bis(acryloyloxyethyl) hydroxyethyl isocyanurate, bis(methacryloyloxyethyl) hydroxyethyl isocyanurate, bis(2-acryloyloxypropyl)-2-ethoxypropyl isocyanurate, bis(2-methacryloyloxypropyl)-2-hydroxypropyl isocyanurate, tris(acryloyloxyethoxyethyl) isocyanurate, tris(methacryloyloxyethoxyethyl) isocyanurate, bis(acryloyloxyethoxyethyl)-2-hydroxyethoxyethyl isocyanurate, bis(methacryloyloxyethoxyethyl)-2-hydroxyethoxyethyl isocyanurate, and the like; these compounds may be used singly or in a mixture of two or more.

From among these, poly[(meth)acryloyloxyalkyl)] isocyanurates, bis(acryloyloxyethyl)hydroxyethyl isocyanurate and tris(acryloyloxyethyl)isocyanurate provide substantial improvements in the toughness, weather resistance, and durability of the cured coating, and thus are preferable.

Component (b-2)

Component (b-2), a urethane poly(meth)acrylate with an alicyclic skeleton, along with at least two (meth)acryloyloxy groups in the molecule, is a component which is most effective in improving the dispersion stability of ultraviolet-curable silicone(A) in the coating composition of this invention, thereby preventing the ultraviolet-curable silicone (A) from phase separating in the cured coating generated from the coating material of this invention, so that the coating composition of this invention gives a cured coating with improved toughness, flexibility, crack-resistance, heat-resistance, and weather resistance, as well as the clarity of the cured coating.

The urethane poly(meth)acrylate used in this invention is highly compatible with the ultraviolet-curable silicone (A) so as to enable the provision of a clear cured coating, even when a thick coating is formed.

The urethane poly(meth)acrylate (b-2) having an alicyclic skeleton includes a urethane formation reaction product between a (meth)acrylate containing a hydroxyl group and a polyisocyanate compound having an alicyclic skeleton and two or more isocyanate groups in the molecule, and a urethane reaction product obtained by synthesizing adducts by treating a polyisocyanate having an alicyclic skeleton and two or more isocyanate groups in the molecule with a polyol, polyether, polyester or polyamide diol, followed by adding a hydroxyl-containing (meth)acrylate to the remaining terminal isocyanate group.

Polyisocyanate compounds having alicyclic skeletons are specifically, for example polyisocyanate monomers, such as isophorone diisocyanate, 4,4'-methylenebis(cyclohexyl) isocyanate, methylcyclohexane-2,4-diisocyanate, methylcyclohexane-2,6-diisocyanate, 1,3-bis(isocyanatomethyl)cyclohexane, and like the biuret trimers thereof, and adducts of these compounds with various polyols and the like. Preferably included are isophorone diisocyanate, and 1,3-bis(isocyanatomethyl)cyclohexane,.

There are no particular limitations as to the polyols which are used for the synthesis of the adducts, but they are specifically, for example, alkylpolyols such as ethylene glycol, propylene glycol, butylene glycol, neopentyl glycol, trimethylol propane, pentaerythtol, sorbitol, mannitol, glycerin, and the like, and polyether polyols derived therefrom; polyester polyols synthesized from polyhydric alcohols and polybasic acids, polyester polyols such as polycaprolactone polyols and the like.

The (meth)acrylates containing hydroxyl groups include, specifically, hydroxyalkyl(meth)acrylates such as 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, 4-hydroxybutyl methacrylate, and the like; addition reaction products of monoepoxy compounds such as butyl glycidyl ether, 2-ethylhexylglycidyl ether, glycidyl methacrylate and the like, with acrylic acid or methacrylic acid; monoacrylate esters or monomethacrylate esters with polyethylene glycol, polypropylene glycol; monoacrylate esters or methacrylate esters of polycaprolactone diol, and the like. A hydroxyalkyl(meth)acrylate containing not more than 4 carbon atoms in this invention is preferred because it is more compatible with component (A), particularly 2-hydroxyethyl acrylate, 2-hydroxypropyl acrylate, 2-hydroxybutyl acrylate, and 4-hydroxybutyl acrylate are preferable.

The reaction of the polyisocyanate with a diol and a (meth)acrylate containing a hydroxyl group is carried out in the presence of a tin-type catalyst such as n-butyl tin dilaurate, or the like, with about equivalent amounts of the isocyanate and hydroxyl groups, by heating several hours at 60–70° C. The reaction product, which is in general often highly viscous, is preferably diluted with an organic solvent or other diluting monomer during or after the end of the reaction.

The component (b-2) in this invention uses a urethane poly(meth)acrylate obtained by treating the above polyisocyanate compound with a hydroxy-containing (meth) acrylate, but in terms of compatibility with component (A), it is preferred to use a urethane poly(meth)acrylate represented by the General Formula (III) below. From among these, it is preferred to use a urethane poly(meth) acrylate obtained by treating one mole of isophorone diisocyanate with 2–2.5 moles of a hydroxyalkyl (meth)acrylate because it gives a cured coating with excellent heat resistance and weather resistance.

A molar ratio less than 2 will result in the polyisocyanate component remaining unreacted, where the residual isocyanate will later react with water to generate urea so that such a cured coating will undergo a change with time, resulting in the unfavorable phenomenon of a yellowing coating or the like. A ratio exceeding 2.5 will cause the hydroxyl-containing (meth)acrylate to remain in excess so that the cured coating will become hydrophilic, reducing its water resistance or weather resistance.

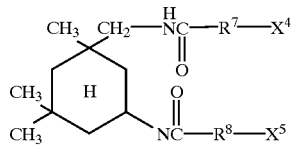

(III)

(where $X^4$ and $X^5$ represent acryloyloxy or methacryloyloxy group, $R^7$ and $R^8$ represent alkyleneoxy or polyalkyleneoxy group.

These urethane poly(meth)acrylates may be used singly or as a mixture of two or more.

The use ratio of components (b-1) with (b-2) should be in the weight ratio of (b-1)/(b-2)=30–90/10–70, preferably 40–80/20–60 (totaling 100 parts by weight). A use ratio deviating from the above range, for example, a ratio exceeding 70 parts by weight for the component (b-2) will give a cured coating with reduced abrasion resistance or adhesion, while a level less than 10 parts by weight will decrease the compatibility with the ultraviolet-curable silicone (A) giving a cured coating with reduced clarity from a coating composition prepared therefrom.

For the purpose of improving the adhesion, flexibility, toughness, weather resistance, and durability of the cured coating, one may compound in the coating composition of this invention a monomer having one or more (meth) acryloyloxy groups in the molecule. Specifically, one may use a monomer disclosed in Japanese Patent Laid-open Publication No. Hei7-109355. In particular, it is preferred to make a combined use of an alkylene glycol di(meth)acrylate (b-3), represented by General Formula (V) given below.

(V)

(where $R^{12}$ represents a branch or linear hydrocarbon group with 4–12 carbons; $X^9$ and $X^{10}$ are acryloyl to methacryloyl group).

Among those represented by the General Formula (V), specific examples suitable for providing a cured coating with substantial improvement in adhesion include 1,6-hexane diol diacrylate and 1,9-nonane diol diacrylate.

The use ratio of component (b-3) may be within the range of not more than 20 parts by weight per 100 parts by weight of component (B), preferably in the range of 2–20 parts by weight, more particularly in the range of 5–15 parts by weight.

If this component (b-3) exceeds 20 parts by weight, this will give a cured coating with reduced abrasion resistance or curability, in addition, it will show reduced compatibility with the ultraviolet-curable silicone (A), thereby resulting in a cured coating with reduced clarity.

The use ratio of component (B) should be 45–95 parts by weight, preferably 60–90 parts by weight per 100 parts by weight of the coating composition comprising components (A)–(C). A use ratio of (B) less than 45 parts by weight fails to give sufficient toughness, adhesion, heat resistance, or weathering resistance, while a level exceeding 95 parts by weight will reduce abrasion resistance.

(C) Component (Photo-Polymerization Initiator)

The coating composition of this invention contain a photo-polymerization initiator (C).

Component (C) specifically includes, for example, carbonyl compounds such as benzoin, benzoin methylether, benzoin ethylether, benzoin isopropylether, benzoin isobutylether, acetoin, butyroin, toluoin, benzil, benzophenone, p-methoxybenzophenone, diethoxyacetophenone, 2,2-dimethoxy-2-phenylacetophenone, methylphenyl glyoxylate, ethylphenyl glyoxylate, 4,4-bis(dimethylaminobenzophenone), 2-hydroxy-2-methyl-1-phenylpropane-1-on, 1-hydroxycyclohexylphenyl ketone, 1-(4-isopropylphenyl)-2-hydroxy-2-methylpropane-1-on, and the like; sulfur compounds such as tetramethylthiuram disulfide, and the like; azo compounds such as azobisisobutyronitrile, azobis-2,4-dimethylvalcronitrile, and the like; peroxide compounds such as benzoyl peroxide, ditertiary-butyl peroxide, and the like; acylphosphine oxide compounds such as 2,4,6-trimethylbenzoyldiphenylphosphine oxide, bis(2,6-dimethoxybenzoyl)-2,4,4-trimethylpentylphosphine oxide, and the like.

Preferred initiators are, for example, benzophenone, methylphenyl glyoxylate, 2-hydroxy-2-methyl-1-phenylpropane-1-on, 1-hydroxycyclohexylphenyl ketone, 2,4,6-trimethylbenzoyldiphenylphosphine oxide; and these may be used alone or in combination of two or more.

The use ratio of components (C) should be 0.01–5 parts by weight, preferably 0.1–3 parts by weight, per 100 parts by weight of a coating composition comprising components (A)–(C). A use ratio of component (C) exceeding 5 parts by weight causes coloration of the cured coating, lowering its weathering resistance. A level less than 0.01 parts by weight causes the polymerization reaction to be incomplete.

The aforementioned components (A)–(C) are essential components that constitute the coating composition of this invention, but one may add to the coating composition of this invention with the objectives of improving weather resistance and durability an ultraviolet absorber as component (D) and a photo-stabilizer as component (E).

Component (D) ultraviolet stabilizer is not particularly limited and any type can be used if it is uniformly soluble in the composition and provides good weather resistance; but in terms of good solubility and improved weather resistance with respect to the composition, it is preferred to use an ultraviolet absorber which is a compound derived from benzophenone, benzotriazole, phenylsalicylate, phenyl benzoate types having a wavelength of maximum absorption being in the range of 240–380 nm. A benzophenone type ultraviolet absorber is preferred in that it can be incorporated in large amounts in the composition and a benzotriazole ultraviolet absorber is preferred from the standpoint of preventing a substrate such as polycarbonate from yellowing.

Ultraviolet absorbers include specifically, for example, 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy-4-methoxybenzophenone 2,2'-dihydroxy-4,4'-dimethoxybenzophenone, phenylsalicylate, p-tert-butylphenyl salicylate, p-(1,1,3,3-tetramethylbutyl) phenylsalicylate, 3-hydroxyphenylbenzoate, phenylene-1,3-dibenzoate, 2-(2-hydroxy-5-methylphenyl) benzotriazole, 2-(2-hydroxy-5-tert-butylphenyl) benzotriazole, 2-(2-hydroxy-3,5-di-tert-butylphenyl)-5-chlorobenzotriazole, 2-(2-hydroxy-3,5-di-tert-butylphenyl)benzotriazole, 2-(2-hydroxy-5-tert-octylphenyl)benzotriazole, 2-(2'-hydroxy-5'-methacryloyloxyethylphenyl)-2H-benzotriazole, bis(2,4-dimethylphenyl)-(2-hydroxy)-4-(3-myristyloxy-2-hydroxypropyloxy)phenyltriazine and the like. These may be used singly or in a combination of two or more.

From among these mentioned above, it is preferred to use at least 1 selected from 2-(2-hydroxy-5-t-butylphenyl) benzotriazole, 2-(2'-hydroxy-5'-methacryloyloxyethylphenyl)-2H-benzotriazole, bis(2,4-dimethylphenyl)-(2-hydroxy)-4-(3-myristyloxy-2-hydroxypropyloxy)phenyltriazine.

The amount of the ultraviolet absorber used is preferably in the range of 3–10 parts by weight per 100 parts by weight of a coating composition comprising components (A)–(C) and a level less than 3 parts by weight does not give sufficient effect of addition while a level exceeding 10 parts by weight begins to cause the cured coating to have lowered abrasion resistance.

One may use a hindered amine-type photo-stabilizer as a component (E) photo-stabilizer. Such photo-stabilizers, when used in combination with an ultraviolet absorber, further improves the weather resistance of the cured coating. The hindered amine photo-stabilizers specifically include, for example, bis(1,2,2,6,6-pentamethyl-4-piperidyl) sebacate, bis(2,2,6,6-tetramethyl-4-piperidyl)sebacate, 2-(3, 5-di-tert-butyl-4-hydroxybenzyl)-2-n-butylmalonic acid bis (1,2,2,6,6-pentamethyl-4-piperidyl), and the like. From among these, it is particularly preferred to use bis(1,2,2,6, 6-pentamethyl-4-piperidyl)sebacate and bis(2,2,6,6-tetramethyl-4-piperidyl)sebacate. The amount of the photo-stabilizer used is preferably in the range of 0.05–1 part by weight per 100 parts by weight of a coating composition comprising components (A)–(C).

The coating composition of this invention may further optionally contain additives such as an organic solvent, an antioxidant, a yellowing inhibitor, a bluing agent, a pigment, a leveling agent, a defoamer, a viscosity enhancing agent, a sedimentation inhibitor, an anti-static agent, an anti-hazing agent, and the like.

The organic solvent used as a component (F) organic solvents can provide the coating composition of this invention with improved uniform solubility, dispersion stability, adhesion to substrate, flatness and uniformity of the coating, and the like, and can be used in amounts of 100–500 parts by weight, preferably in the range of 150–300 parts by weight per 100 parts by weight of the total amount of components (A)–(E).

The organic solvent (F) is not particularly limited in types, but specifically includes at least one type selected from organic solvents such as alcohols, hydrocarbons, halogenated hydrocarbons, ethers, ketones, esters, polyhydric alcohol derivatives, and the like. In particular, in terms of the uniform solubility, dispersion stability, and additionally, the adhesion with substrate, and the flatness and uniformity of the cured coating, and the like, for the coating composition, it is preferred to use, particularly, a combination comprising 20–50% by weight of an alcoholic type organic solvent (f-1), 20–50% by weight of an acetate ester type organic solvent (f-2) and 5–30% by weight of an alkyleneoxy alkyl alcohol type organic solvent (f-3), as the organic solvent (F) component.

It is particularly preferred to use a mixture of organic solvents comprising combination of at least 1 type selected from isobutanol and n-butanol, as a component (f-1), at least 1 type selected from n-butyl acetate, and isobutyl acetate as a component (f-2), and at least 1 type selected from 3-methoxy-1-propanol, 3-methoxy-2-propanol, 3-methoxy-1-butanol and 3-methoxy-2-butanol, as component (f-3).

There are no particular limitations as to the method of applying the coating composition of this invention to a substrate, and such usual procedures as brushing, spray coating, dip coating, spin coating, curtain coating, or the like may be used.

The amount of the coating composition applied is preferably in such range as to provide the coated thickness of the cured coating in the range of 3–30 $\mu$m, preferably 5–25 $\mu$m, most preferably, 8–20 $\mu$m. A coating thickness in less than 3 $\mu$m fails to give sufficient abrasion resistance, while a level exceeding 30 $\mu$m may decrease the adhesion to the substrate or tend to cause crack formation of the coating.

The means used for curing the applied coating on the substrate include the method known in the art of irradiating with actinic energy rays such as $\alpha$, $\beta$ and $\gamma$ rays, but it is preferred to use ultra-violet as a means to cure the coating composition of this invention. The source for generating ultraviolet light, in terms of practicality and economics, an ultraviolet lamp is generally used. Specifically, included are a low pressure mercury lamp, a high pressure mercury lamp, a super high pressure mercury lamp, a xenon lamp, a metal halide lamp, and the like. The atmosphere for the irradiation may be air or may be an inert gas such as nitrogen, argon, and the like.

After the coating composition of this invention has been applied to the surface of a synthetic resin molded article, but before it is cured by an ultraviolet radiation energy, one may carry out a heat treatment using infrared light or a hot air oven at 20–120° C. for 1–60 minutes, with the objective of improving the adhesion of the cured coating to the substrate.

The coating composition of this invention can be used to improve the surface of a variety of synthetic resin molded article substrates. The synthetic resin molded articles include a variety of thermoplastic resins and thermosetting resins, for which it has been desired to improve abrasion resistance, weather resistance, and the like. Specifically included are, for example, polymethylmethacrylic resins, polycarbonate resins, polyester resins, polystyrene resins, polyolefin resins, acryonitrile-styrene copolymer resins, polyamide resins, polyarylate resins, polymethacryamide resins, polyallyldiglycol carbonate resins, and the like. It is particularly effective to use for the coating composition of this invention substrates such as polymethylmethacrylic resin, polycarbonate resin, polystyrene resin, polymethacrylamide resin because they are excellent in clarity and are in strong need for improvement of abrasion resistance. Synthetic resin molded articles include resin sheet molded articles, film molded articles, various injection molded articles, and so on.

The present invention is further described in detail using the examples of this invention. Incidentally, "parts" in these examples and comparative examples are by weight.

Evaluations were made using the following methods in these examples and comparative examples.

EXAMPLES

1. Abrasion-Resistance (1) Taber Abrasion test

An abrasion test was carried out under conditions of an abrasive wheel CS-10F, load 500 g, number of revolutions at 500 cycles, according to ASTM D-1044. After the abrasion test, the sample was washed using a neutral detergent and its haze value was measured using a haze meter. Abrasion resistance is shown by the value of (the haze value after abrasion–haze value before abrasion).

(2) Steel Wool-Test

A piece of #000 steel wool (manufactured by Nippon Steel Wool Co., Ltd, "Bonstar" [phonetically translated] trademark) was attached to a 1 $cm^2$ circular pad; this pad was placed on the surface of a sample held on a reciprocating abrasion tester table and the sample was subjected to abrasion test at 50 cycles under a load of 1000 g. The sample was washed with a neutral detergent and its haze value was measured by a haze meter. Abrasion resistance is expressed by (the haze value after abrasion–haze value before abrasion).

2. Adhesion

The surface of a sample was cut to reach into the substrate making 11 longitudinal and transverse lines at a 1.5 mm gap between each line amounting to 100 grids; a piece of cellophane tape (25 mm wide, manufactured by Nichiban Co., Ltd.) was pressed against the grids and is then removed upward abruptly.

The evaluation of the adhesion is expressed in terms of the number of remaining grids/the number of total grids (100).

3. Appearance (1) Clarity

Method A

The haze value according to ASTM D-1003 was measured using a haze meter.

Method E

Clarity was evaluated in a dark place by illuminating the sample surface with a halogen lamp being as a light source (Device: ESCA ILLUMINATOR, MODELELI-050, manufactured by Mitsubishi Rayon Co. Ltd.) to be designated according to the following standard:

○: cured coating clear and not turbid (haze value 0–0.2%)

Δ: cured coating slightly turbid (haze value 0.3–0.6%)

x: cured coating turbid and turbidness is clearly identifiable (haze value 0.7% or higher)

(2) Cracks

A visual inspection was made and the following rating standard was used.

○: no crack formed

Δ: some cracks formed x: numerous cracks formed

4. Heat Resistance

A sample was held for 200 hours in a 130° C. hot air oven and it was visually inspected to evaluate heat resistance.

○: no change

Δ: some small cracks x: numerous cracks

5. Weather Test

An accelerated exposure test was carried out using a sunshine weather weatherometer (manufactured by Suga Test Instruments Co., Ltd, WEL-SUN-DC model) under conditions of a black panel temperature being at 63° C., irradiation with water sprayed 12 minutes and irradiation 40 minutes in 1 cycle for a total of 2000 hours. The exposed samples was tested for its clarity by a haze value; the cracks in the coating were visually inspected and adhesion also evaluated.

Synthesis of component (A)

Synthetic Example 1

Synthesis of Ultraviolet-curable Silicone (SC-1)

Into a 3-liter 4-necked flask provided with a stirrer, thermometer, and condenser, were metered in 2000 parts of an isopropanol silica sol (dispersion medium: isopropanol, SiO2 concentration: 30% by weight, primary particle size: 12 mμ, manufactured by Nissan Chemical Industries, Ltd. under a trade name of IPA-ST, (hereafter abbreviated as IPA-ST), and 382 parts of 3-methacryloyloxy propyltrimethoxy silane (tradename: TSL-8370, Toshiba Silicone Co., Ltd.) (hereafter abbreviated as TSL-8370), followed by heating with stirring, gradually adding dropwise 139 parts of a 0.001N aqueous hydrochloric acid solution simultaneously upon the commencement of the refluxing of the volatile components, and continuing stirring for 2 hours at reflux after the completion of the dropwise addition for carrying out hydrolysis. After the completion of the hydrolysis, the volatile components such as alcohol, water, and the like, were allowed to distill off under atmospheric conditions, followed by adding 600 parts of toluene when the concentration of solids (the total amount of the 600 parts of IP-ST SiO2 and 317 parts of TSL-8370 amounting to 917 parts), reached about 60% and azeotropically distilling off alcohol and water, along with toluene.

Then 1,500 parts of toluene were added in several increments to completely replace the solvent to convert this system into a dispersed system in a toluene. The solids concentration was about 40% by weight. The reaction was further carried out at for 4 hours at 110° C., while toluene was allowed to distill off to bring the solids concentration to about 60% by weight. The resultant ultraviolet-curable silicone (hereafter abbreviated as SC-1) was a yellowish Newtonian-fluid-type clear and viscous liquid and had a viscosity of 20 centipoise at 25° C. The solids concentration was 61% by weight in terms of residue on heating. The residue on heating is expressed by (weight in g after heating/weight before heating in g)×100% by weight under heating conditions of 3 hours at 105° C.

Synthetic Example 2

Synthesis of Ultraviolet-curable Silicone (SC-2)

A ultraviolet-curable silicone (SC-2) was synthesized by an operation similar to that for Synthetic Example 1, except for changing the amounts of IP-ST to 2290 parts and TSL-8370 to 295 parts. The resultant ultraviolet-curable silicone (SC-2) was a yellow Newtonian-fluid-type clear and viscous liquid and had viscosity of 14 centipoiseat 25° C. The solids concentration was 61% in terms of residue on heating.

Synthetic Example 3

Synthesis of Ultraviolet-curable Silicone (SC-3)

A ultraviolet-curable silicone (SC-3) was synthesized by an operation similar to that for Synthetic Example 1, except for changing the amounts of IP-ST to 1,637 parts and TSL-8370 to 491 parts. The resultant ultraviolet-curable silicone (SC-3) was a yellow Newtonian-fluid-type clear and viscous liquid and had a viscosity of 42 centipoiseat 25° C. The solids concentration was 61% in terms of residue on heating.

Component (B)
Synthesis of Component (b-1)

Synthetic Example 4

Synthesis of Urethane Diacrylate (UPA-1)

Into a 1-liter 3-necked flask provided with a stirrer and thermometer were metered in 243.6 parts of 2-hydroxyethyl acrylate, 0.23 parts of di-n-butyltin dilaurate, and 0.3 parts of hydroquinone monomethylether, followed by stirring at 55° C. and adding dropwise, 222.0 parts of isophorone diisocyanate in 3 hours. After completion of the dropwise addition, the reaction was further continued for 8 hours at 70° C. when the viscosity increased, so that the contents were diluted with n-butyl acetate to give a urethane diacrylate (UPA-1) having a final solids concentration of 90% by weight.

Synthetic Example 5

Synthesis of Urethane Diacrylate (UPA-2)

Into a 1-liter 3-necked flask provided with a stirrer and thermometer were metered in 425 parts of dodecabutyleneglycol (tradename: PTG-850, manufactured by Hodogaya Chemical Industries Co., Ltd, molecular weight 850), 0.43 parts of di-n-butyltin dilaurate, 0.4 parts of hydroquinone monomethylether, followed by stirring at 55° C. and adding dropwise, 222 parts of isophorone diisocyanate in 3 hours. After completion of the dropwise addition, the reaction was further continued for 3 hours at 70° C. and then temperature was reduced to 60° C., then 122 parts of 2-hydroxyethyl acrylate was added dropwise in 2 hours. Since the viscosity increased, 193 parts of n-butyl acetate was added and the reaction was continued for 5 hours at 70° C. to give an urethane diacrylate (UPA-2) with a solids concentration of 80% by weight.

Synthetic Example 6

Synthesis of Urethane Triacrylate (UPA-3)

A 2-liter 3-necked flask provided with a stirrer and thermometer were metered in 365.4 parts of 2-hydroxyethyl acrylate, 0.45 parts of di-n-butyltin dilaurate, and 0.4 parts of hydroquinone monomethylether, followed by stirring at 55° C. and adding dropwise in 3 hours, 543.1 parts of a triisocyanate (tradename: Duranate TPA-100, manufactured by Asahi Kasei Kogyo Co., Ltd.), a trimer of hexamethylene diisocyanate and having an isocyanurate skeleton. After the end of the dropwise addition, the reaction was further continued for 8 hours at 70° C. when the viscosity increased so that n-butyl acetate was used to dilute to give a urethane triacrylate (UPA-3) having a final solids concentration of 90% by weight.

Synthetic Example 7

Synthesis of an Aliphatic Urethane Acrylate (UPA-4)

Into a 2-liter 3-necked flask provided with a stirrer and thermometer were metered in 243.6 parts of 2-hydroxyethyl acrylate, 0.21 parts of di-n-butyltin dilaurate, and 0.27 parts of hydroquinone monomethylether, followed by stirring at 55° C. and adding dropwise in 3 hours, 168 parts of hexamethylene diisocyanate. After the end of the dropwise addition, the reaction was further continued for 8 hours at 70° C. to obtain a urethane triacrylate (UPA-4).

Example 1

A coating composition was prepared according to the composition given in Table 1. This coating composition was spray coated to a thickness of 3 mm on a methacrylic resin injection molding sheet (Acrypet VH, color tone 001, clear, manufactured by Mitsubishi Rayon Co., Ltd.), followed by being left to dry for 5 minutes at room temperature and then heat-dried for 5 minutes at 80° C. in a drier. Then, the dried sample in an air environment was irradiated with ultraviolet light at 1,000 mJ/cm$^2$ (ultraviolet integrated energy at wavelength 320–380 nm) using a high pressure mercury lamp to obtain a abrasion resistant methacrylic resin sheet with a 10 μm cured coating film thickness. Table 2 shows the results of performance evaluation.

Example 2–13 and Comparative Examples 1–8

Coating compositions with the compositions given in Table 1 were prepared. The coating compositions were spray coated to a thickness of 3 mm onto polycarbonate resin injection molded sheets (Lexan LS-2, color tone 111, clear, manufactured by General Electric Company), followed by being left to dry for 5 minutes at room temperature, and heat-dried for 5 minutes at 80° C. in a drier. Then the dried sample was irradiated in an air environment with ultraviolet light at 2,000 mJ/cm$^2$ (ultraviolet integrated energy at wavelength 320–380 nm) using a high pressure mercury light to give abrasion resistant polycarbonate resin sheets with a 10 μm cured coating film thickness. The results of performance evaluation are given in Table 2.

Comparative Example 9

Example 2 was repeated, except for replacing the UPA-1 of example 2 with 24 g of UPA-4, to give a abrasion resistant resin sheet with a 10 μm cured coating film thickness. The results of performance evaluation are given in Table 2.

The symbols used in these tables represent the following compounds:

UPA-1: A urethane di(meth)acrylate having an alicyclic skeleton

UPA-2: A urethane di(meth)acrylate having an alicyclic skeleton

UPA-3: A nonaromatic, cyclic aliphatic urethane poly (meth)acrylate

UPA-4: A linear chain aliphatic urethane poly(meth) acrylate

TAEIC: Tris(acryloyloxyethyl)isocyanurate (tradename: ARONIX M-315, manufactured by Toa Gosei Chemical Industries Co., Ltd)

BAEIC: Bis(acryloyloxyethyl)hydroxyethyl isocyanurate (tradename: ARONIX M-215, manufactured by Toa Gosei Chemical Industries Co., Ltd))

NDDA: 1,9-Nonane diacrylate (tradename: VISKOT #260, manufactured by Osaka Organic Chemical Industries, Co., Ltd.)

APO: 2,4,6-trimethylbenzoyldiphenylphosphine oxide (tradename: LUCERIN-TPO, manufactured by BASF)

MPG: Methylphenyl glyoxylate (tradename: BAICURE 55, manufactured by Stauffer)

UVA: 2-(hydroxy-5-tert-butylphenyl)benzotriazole (tradename: TINUVIN-PS, manufactured by Ciba Geigy Co., Ltd.)

HALS: bis(2,2,6,6-tetramethyl-4-piperidyl)sebacate (tradename: SANOL LS-770, manufactured by Sankyo Co., Ltd.)

Solvent 1: Isobutyl alcohol

Solvent 2: n-butyl acetate

Solvent 3: 1-methoxy-2-propanol

Solvent 4: Toluene

TABLE 1

Coating Composition (% By Weight)

| Examples | Component (A) Type | Component (A) Solids | Component (b-1) TAEIC | Component (b-1) BAEIC | Solids in Component (b-2) UPA-1 | Solids in Component (b-2) UPA-2 | Solids in Component (b-2) UPA-3 | Solids in Component (b-2) UPA-4 | Component (b-3) NDDA | Component (C) MPG | Component (C) APO |
|---|---|---|---|---|---|---|---|---|---|---|---|
| Example 1 | SC-1 | 30 | 44 | — | 24 | — | — | — | — | 1 | 1 |
| Example 2 | SC-1 | 30 | 44 | — | 24 | — | — | — | — | 1 | 1 |
| Example 3 | SC-1 | 30 | — | 48 | 20 | — | — | — | — | 1 | 1 |
| Example 4 | SC-1 | 30 | 24 | 20 | 24 | — | — | — | — | 1 | 1 |
| Example 5 | SC-2 | 30 | 42 | — | — | 21 | — | — | 5 | 1 | 1 |
| Example 7 | SC-2 | 30 | — | 48 | — | 20 | — | — | — | 1 | 1 |
| Example 10 | SC-1 | 43 | 10 | 15 | 30 | — | — | — | — | 1 | 1 |
| Example 12 | SC-1 | 30 | — | 55 | 13 | — | — | — | — | 1 | 1 |
| Example 13 | SC-1 | 30 | 19 | 20 | 24 | — | — | — | 5 | 1 | 1 |
| Comparative Example 1 | — | — | 49 | — | 49 | — | — | — | — | 1 | 1 |
| Comparative Example 2 | SC-1 | 70 | 14 | — | 14 | — | — | — | — | 1 | 1 |
| Comparative Example 3 | SC-1 | 30 | 68 | — | — | — | — | — | — | 1 | — |
| Comparative Example 4 | SC-1 | 30 | — | 68 | — | — | — | — | — | 1 | 1 |
| Comparative Example 5 | SC-1 | 30 | 34 | 34 | — | — | — | — | — | 1 | 1 |
| Comparative Example 6 | SC-1 | 30 | — | — | 68 | — | — | — | — | 1 | 1 |
| Comparative Example 7 | SC-1 | 30 | — | — | — | 68 | — | — | — | 1 | 1 |
| Comparative Example 9 | SC-1 | 30 | 44 | — | — | — | — | 24 | — | 1 | 1 |

Example 2–13 and Comparative Examples 1–8 received 5 parts by weight of UVA and 0.2 parts by weight of HALS per 100 parts by weight of the coating compositions of Table 1.

The coating compositions of Table 1 were all diluted with a solvent mixture at the ratio of Solvent 1/Solvent 2/Solvent 3/Solvent 4=40/30/20/10 (% by weight) to bring the coating composition solids to 40%.

Incidentally, Comparative Example 4 is a comparative example corresponding to an example of Japanese Patent Laid-open Publication No. Hei3-275769; Comparative Example 9 is an example using an aliphatic urethane poly (meth)acrylate, corresponding to an example of Japanese Patent Laid-open Publication No. Hei4-214743.

TABLE 2

Results of Performance Evaluation

| Examples | 1. Adhesion Resistance Taber | 1. Adhesion Resistance Steel Wool | 2. Adhesion | 3. Appearance Clarity Method A | 3. Appearance Clarity Method B | 3. Appearance Cracks | 4. Heat Resistance | 5. Weathering Resistance Clarity Method A | 5. Weathering Resistance Adhesion | 5. Weathering Resistance Crack |
|---|---|---|---|---|---|---|---|---|---|---|
| Example 1 | 13.5 | 0.7 | 100/100 | 0.1 | ○ | ○ | ○ | 3.2 | 100/100 | ○ |
| Example 2 | 14.6 | 1.0 | 100/100 | 0.2 | ○ | ○ | ○ | 2.0 | 100/100 | ○ |
| Example 3 | 17.0 | 2.0 | 100/100 | 0.2 | ○ | ○ | ○ | 2.2 | 100/100 | ○ |
| Example 4 | 15.5 | 1.5 | 100/100 | 0.2 | ○ | ○ | ○ | 2.3 | 100/100 | ○ |
| Example 5 | 15.7 | 1.4 | 100/100 | 0.2 | ○ | ○ | ○ | 2.1 | 100/100 | ○ |
| Example 7 | 18.0 | 2.4 | 100/100 | 0.2 | ○ | ○ | ○ | 2.4 | 100/100 | ○ |
| Example 10 | 10.0 | 0.8 | 100/100 | 0.1 | ○ | ○ | ○ | 2.6 | 100/100 | ○ |
| Example 12 | 16.2 | 1.7 | 100/100 | 0.3 | ○ | ○ | ○ | 3.1 | 100/100 | ○ |
| Example 13 | 15.9 | 1.6 | 100/100 | 0.2 | ○ | ○ | ○ | 2.0 | 100/100 | ○ |
| Comparative Example 1 | 45.0 | 8.8 | 100/100 | 0.2 | ○ | ○ | ○ | 3.9 | 100/100 | ○ |
| Comparative Example 2 | 6.5 | 0.2 | 65/100 | 0.2 | ○ | Δ | X | 25 | 10/100 | X |
| Comparative Example 3 | 12.3 | 0.9 | 100/100 | 0.5 | Δ | ○ | Δ | 4.5 | 100/100 | Δ |
| Comparative Example 4 | 15.6 | 1.3 | 100/100 | 0.7 | X | ○ | Δ | 2.3 | 100/100 | ○ |
| Comparative Example 5 | 14.0 | 1.1 | 100/100 | 0.6 | Δ | ○ | Δ | 2.2 | 100/100 | ○ |
| Comparative Example 6 | 25.0 | 4.5 ○ | 0/100 | 0.1 | ○ | ○ | ○ | 2.3 | 0/100 | ○ |

TABLE 2-continued

Results of Performance Evaluation

| Examples | 1. Adhesion | | 2. Adhesion | 3. Appearance | | | 4. Heat Resistance | 5. Weathering Resistance | | |
| --- | --- | --- | --- | --- | --- | --- | --- | --- | --- | --- |
| | Resistance | | | Clarity | | | | Clarity | | |
| | Taber | Steel Wool | | Method A | Method B | Cracks | | Method A | Adhesion | Crack |
| Comparative Example 7 | 27.0 | 5.5 | 0/100 | 0.1 | ○ | ○ | ○ | 2.1 | 0/100 | |
| Comparative Example 9 | 14.5 | 0.9 | 100/100 | 0.5 | Δ | ○ | X | 4.4 | 50/100 | Δ |

The coating composition of this invention is excellent not only in curability but also in the effect of improving abrasion resistance of synthetic resin molded articles, and is particularly useful in automotive related parts that strongly demand durability and weather resistance, particularly for applications in headlight lenses, tail lights, side lights and the like.

What is claimed is:

1. A abrasion resistant coating composition comprising:
(A) 1–50 parts by weight (as solids) of an ultraviolet-curable silicone prepared by chemically modifying 40–90% by weight (as solids) of particulate colloidal silica (a-1) with 10–60% by weight (as solids) of a radical polymerizable silane compound or a hydrolysis product thereof (a-2) represented by the following Formula (I),

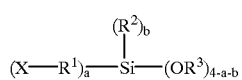

(where X represents $CH_2=CH-COO-$, $CH_2C(CH_3)-COO-$, or $CH_2=CH-$; $R^1$ is an alkylene group with 0–8 carbons; $R^2$ and $R^3$ are alkyl groups with 1–8 carbons; a is a positive integer of 1–3; b is a positive integer of 0–2; and a+b is a positive integer of 1–3);

(B) 45–95 parts by weight of a monomer mixture comprising 30–90 parts by weight of a tris[(meth)acryloyloxy alkyl]isocyanurate(b-1) represented by the following Formula (II),

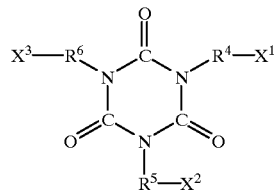

(where $X^1$, $X^2$ and $X^3$ are each either an acryloyl group or a methacryloyl group, $R^4$, $R^5$ and $R^6$ represent an oxyalkylene group or polyoxyalkylene group) and 10–70 parts by weight of a urethane poly(meth)acrylate (b-2) having an alicyclic skeleton along with at least two (meth)acryloyloxy groups in the molecule (wherein the total amount of components (b-1) and (b-2) is 100 parts by weight); and (C) 0.01–5 parts by weight of a photo-polymerization initiator (where the total amount of components (A)–(C) is 100 parts by weight).

2. A coating composition as set forth in claim 1, further comprising 3–10 parts by weight of (D) an ultraviolet absorber and 0.05–2 parts by weight of (E) a hindered amine photo-stabilizer per 100 parts by weight of the coating composition as set forth in claim 1.

3. A coating composition as set forth in claim 2 in which the ultraviolet absorber is at least one selected from 2-(2-hydroxy-5-t-butylphenyl) benzotriazole, 2-(2'-hydroxy-5'-methacryloyloxyethylphenyl)-2H-benzotriazole, and bis(2,4-dimethylphenyl)-(2-hydroxy-4-(3-myristyloxy-2-hydroxypropyloxy)phenyl)triazine.

4. A coating composition as set forth in claim 2, wherein the hindered amine photo-stabilizer is at least one selected from bis(1,2,2,6,6-pentamethyl-4-piperidyl)sebacate and bis(2,2,6,6-tetramethyl-4-piperidyl)sebacate.

5. A coating composition as set forth in claim 1, in which the urethane poly(meth)acrylate (b-2) having an alicyclic skeleton is represented by the following General Formula (III),

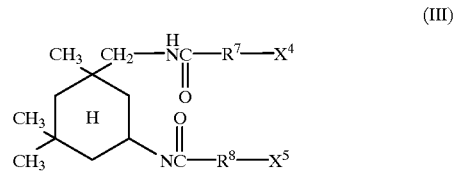

(wherein $X^4$ and $X^5$ represent acryloyloxy or methacryloyloxy; $R^7$ and $R^8$ represent alkyleneoxy or polyalkyleneoxy.

6. A coating composition as set forth in claim 1, in which the tris[meth]acryloyloxyl]isocyanurate (b-1) is at least one selected from tris(acryloyloxyethyl)isocyanurate, and tris(methacryloyloxyethyl)isocyanurate.

7. A coating composition as set forth in claim 1, in which the urethane poly(meth)acrylate (b-2) having an alicyclic skeleton is an adduct of iisophorone isocyanate with at least one selected from 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, and 4-hydroxybutyl methacrylate.

8. A coating composition as set forth in claim 7, in which the urethane poly(meth)acrylate (b-2) having an alicyclic skeleton is prepared by addition reaction of 2–2.5 moles of a hydroxyalkyl(meth)acrylate to 1 mole of isophorone diisocyanate.

9. A coating composition as set forth in claim 1, in which the component (B) is a monomer mixture comprising: 30–70 parts by weight of a tris[(meth)acryloyloxyalkyl] isocyanurate (b-1) represented by the following Formula (II),

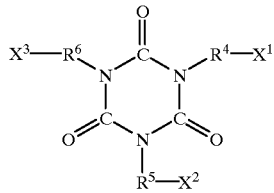
(II)

(where $X^1$, $X^2$ and $X^3$ are each either an acryloyl group or a methacryloyl group; $R^4$, $R^5$ and $R^6$ are oxyalkylene or polyoxyalkylene); 10–50 parts by weight of a urethane poly(meth)acrylate (b-2) having an alicyclic skeleton along with at least two (meth)acryloyloxy groups in the molecule; and 2–20 parts by weight of an alkylene glycol di(meth)acrylate (b-3) represented by the following General Formula (V),

$X^{10}$—O—$R^{12}$—O—$X^9$ (V)

(where $R^{12}$ is a branched or linear hydrocarbon group with 4–12 carbons; $X^9$ and $X^{10}$ are acryloyl or methacryloyl); wherein the total of the components (b-1), (b-2), and (b-3) amounts to 100 parts by weight.

10. A coating composition as set forth in claim 1, in which the photopolymerization initiator, component (C), is used in a combination of 2,4,6-trimethylbenzoyldiphenylphosphine oxide and methylphenyl glyoxylate.

11. A coating composition as set forth in claim 1, comprising:

(A) 1–50 parts by weight (as solids) of an ultraviolet-curable silicone prepared by chemically modifying 40–90% by weight (as solid) of particulate colloidal silica (a-1) with 10–60% by weight (as solids) of a radical polymerizable silane compound or hydrolysis product thereof (a-2), represented by the following General Formula (I),

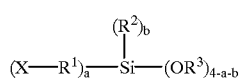
(I)

(where X represents $CH_2=CH$—COO—, $CH_2C(CH_3)$—COO, $CH_2=CH$—; $R^1$ is an alkylene group with 0–8 carbons; $R^2$ and $R^3$ are alkyl groups with 1–8 carbons; a is a positive integer of 1–3; b is a positive integer of 0–2; and a+b is a positive integer of 1–3);

(B) 45–95 parts by weight of a monomer mixture comprising 30–90 parts by weight of a tris[(meth)acryloyloxyalkyl]isocyanurate (b-1) represented by the following Formula (II),

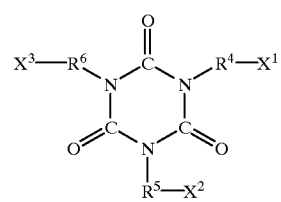
(II)

(where $X^1$, $X^2$ and $X^3$ are each either an acryloyl group or a methacryloyl group; $R^4$, $R^5$ and $R^6$ represent an oxyalkylene group or polyoxyalkylene group), and 10–70 parts by weight of a urethane poly(meth)acrylate (b-2) having an alicyclic skeleton along with at least two (meth)acryloyloxy groups in one molecule (wherein the total amount of components (b-1) and (b-2) is 100 parts by weight);

(C) 0.01–5 parts by weight of a photo-polymerization initiator (where the total amount of components (A)–(C) is 100 parts by weight);

(D) 3–10 parts by weight of an ultraviolet absorber per 100 parts by weight of the total amount of components (A)–(C);

(E) 0.05–2 parts by weight of a hindered photo-stabilizer per 100 parts by weight for the total amount of components (A)–(C); and (F) 100–500 parts by weight of an organic solvent formulated per 100 parts by weight of the total amount of components (A)–(C).

12. A coating composition as set forth in claim 11, in which the organic solvent (F) comprises a combination of 20–50% by weight of an alcoholic organic solvent (f-1), 20–50% by weight of an acetate ester type organic solvent (f-2), and 5–30% by weight of an alkyleneoxyalkyl alcohol type organic solvent (f-3).

13. A coating composition as set forth in claim 11, wherein the organic solvent (F) comprises a combination of at least one (f-1) selected from isobutanol and n-butanol, at least one (f-2) selected from n-butyl acetate and isobutyl acetate, and at least one (f-3) selected from 3-methoxy-1-propanol, 3-methoxy-2-propanol, 3-methoxy-1-butanol and 3-methoxy-2-butanol.

14. A abrasion resistant coated article obtained by coating a clear thermoplastic substrate with a cured coating of a coating composition as set forth in claim 1.

15. A abrasion resistant coated article as set forth in claim 14, in which the clear thermoplastic substrate is polycarbonate.

* * * * *